Dec. 15, 1931.   J. M. SHERMAN   1,837,074
ARBORETUM
Filed Sept. 23, 1929   2 Sheets-Sheet 1

WITNESS

INVENTOR
James M. Sherman
BY
ATTORNEY

Dec. 15, 1931.  J. M. SHERMAN  1,837,074
ARBORETUM
Filed Sept. 23, 1929   2 Sheets-Sheet 2
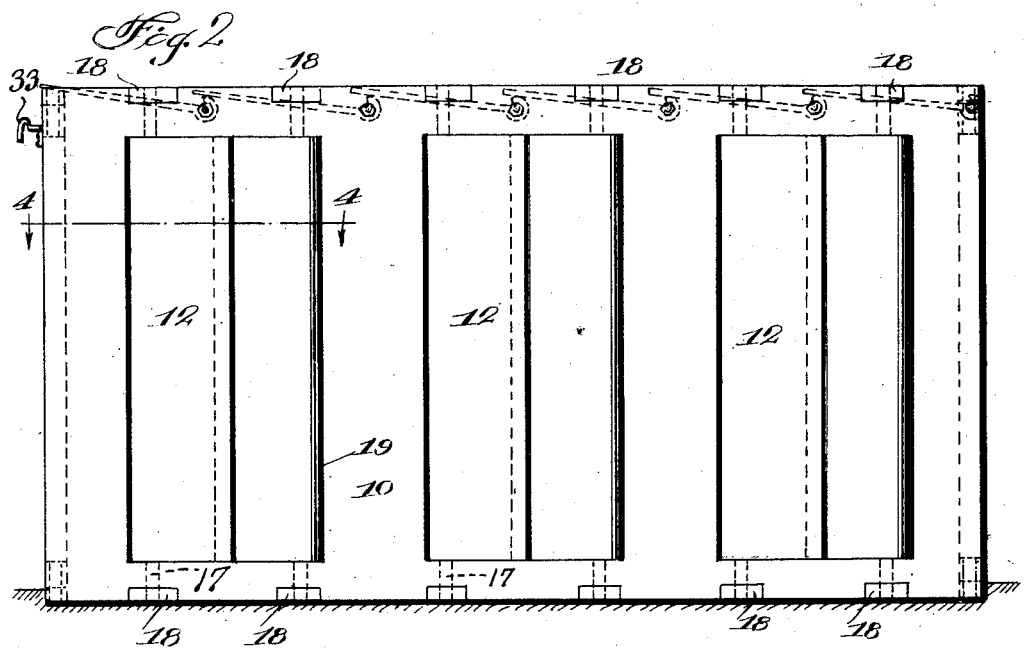
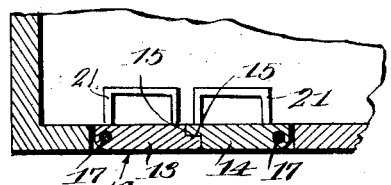
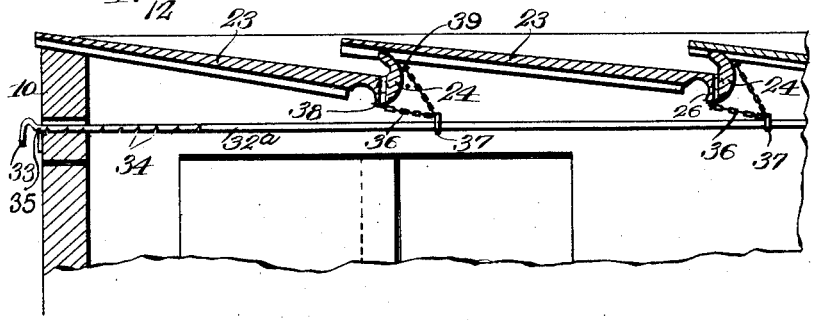
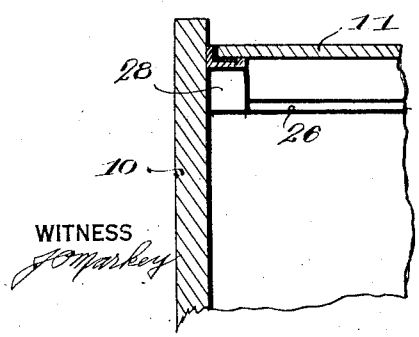
INVENTOR
James M. Sherman
BY
ATTORNEY Patented Dec. 15, 1931

1,837,074

UNITED STATES PATENT OFFICE

JAMES M. SHERMAN, OF PASS CHRISTIAN, MISSISSIPPI

ARBORETUM

Application filed September 23, 1929. Serial No. 394,566.

This invention relates to improvements in plant protecting sheds or what are commonly called arboretums.

Among the general objects of the invention is to provide a structure of the above character which is durable and inexpensive to manufacture and adapted to be utilized for protecting rare plants from the weather in an exceedingly efficient manner.

It is a further object of the invention to provide an arboretum structure provided with a sectional roof or top with supporting and operating means therefor whereby the roof sections may be manipulated in an easy manner for adjusting the extent of exposure of the plants within the arboretum.

A still further object of the invention is that the roof sections as well as the doors may be closed to form a tight and weather excluding arboretum.

It is also an object of the invention that the roof sections be adapted when closed to drain water which may fall thereon in a manner to avoid injury of the plants within the arboretum.

The invention is illustrated by way of example in the accompanying drawings, in which:—

Figure 2 is a side elevation of the same.

Figure 4 is a sectional view taken substantially on the line 4—4 of Figure 2.

Figure 5 is a fragmentary vertical sectional view taken on the line 5—5 of Figure 1, and Figure 6 is a view similar to Figure 5 and take substantially on the line 6—6 of Figure 1.

Figure 1:
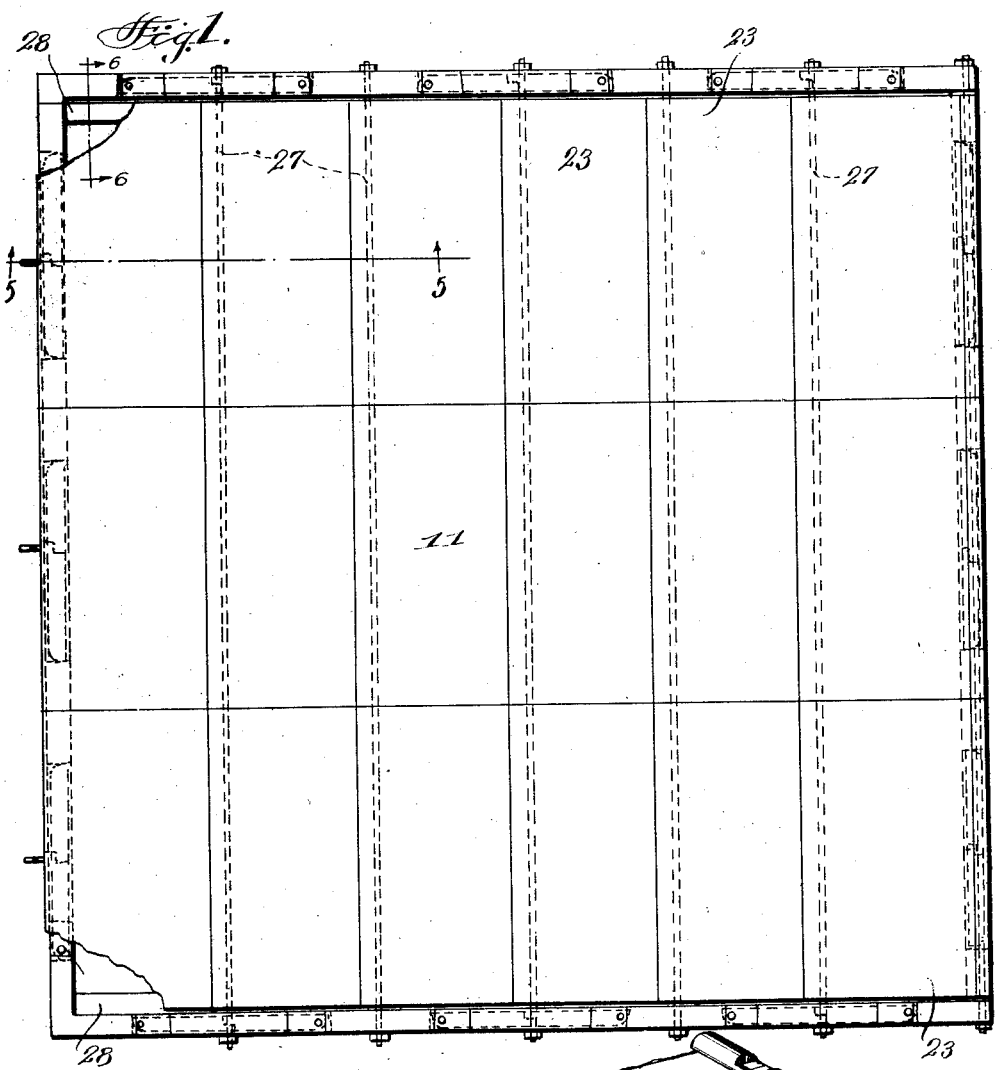
Figure 1 is a top plan view of an arboretum constructed in accordance with the present invention.

Referring to the drawings more particularly, 10 indicates the side walls of the arboretum and 11 the roof or top therefor. The arboretum may be of any shape desired. In the drawings, there is shown a square structure, the four walls 10 being made of concrete which may be reinforced with iron grating or rods if desired. Each wall 10 is provided with one or more doors 12 as shown. Each door comprises two sections 13 and 14. The door sections are preferably of concrete and each has its inner edge offset as at 15 to permit a tight closure as best shown in Figure 4. Adjacent the inner edge of each section there is provided a longitudinally extending bore adapted for receiving a pivot or hinge rod 17. The rods 17 extends through registering openings formed in the walls 10 as shown in Figure 2 and the ends of the rods are anchored by suitable embedded metal plates 18. The door sections may be swung outwardly without injury to plants within the arboretum. The outer edge of each door section is rounded as at 19 to form a close fit with the concave edge 20 of the associated wall. When the door sections are closed, they provide a tight closure for the arboretum as shown in Figure 4.

Each of the door sections 13—14 may be provided with a box 21 upon its inner side in which flowers or vines may be planted.

Now referring to the top or roof 11, the same may comprise a number of sections 23 arranged in rows as shown. Each roof section 23 is in the form of a slab of concrete, preferably rectangular in shape with its one end provided with an enlargement 24 and the slab tapering in thickness toward its other end. The enlargement 24 is provided with a longitudinal bore 25, and a longitudinal recess 26 preferably of the shape shown. The enlargement 24 serves as a counterweight for its roof section or slab 23, and the cavity or recess 26 serves to hold moss or soil in which vines or flowers may be planted.

In constructing the roof 11, the sections 23 are arranged in rows and rods 27 provided for pivotally supporting the sections. Each rod 27 serves for pivotally supporting the sections of each row as plainly shown in Figure 1. The rods 27 are extended through the bores 25 and the ends of the rods are properly secured to suitable cross-beams 28. If desired, pillars or other cross-beams might be used for supporting the roof sections.

Figure 3:
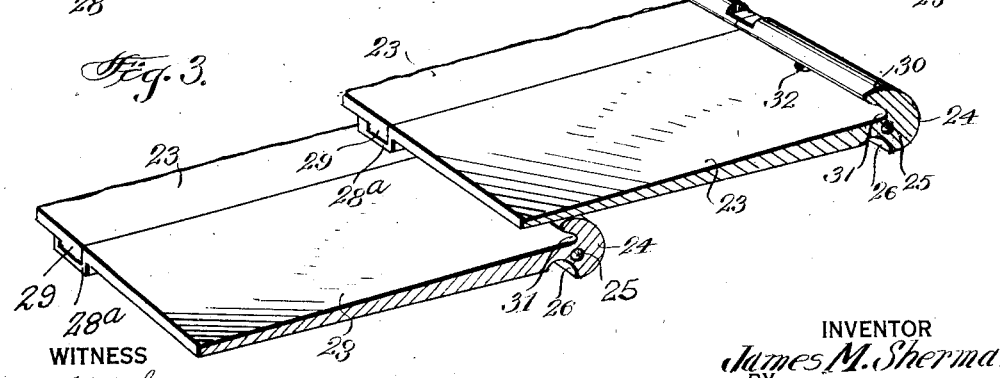
Figure 3 is a detail perspective view illustrating two overlapping roof sections.

As shown in Figure 3, the roof sections are arranged to overlap and interfit with each other. It will be observed that the longitudinal edges of the sections in one row are formed with a substantially U-shaped extension 28a while the longitudinal edge of the section comprising the adjacent row is formed with a rib 29 adapted to fit within the U-shaped sections 28a.

It will be further noted that the ends of the sections in each row overlap, the free end of each section resting upon the lip 30 of the next section and thus maintaining the overlapping portions of the sections in spaced relation and permit water to drain into the gutters 31 formed by the lips 30 and escape through openings 32. If desired, suitable drains may be placed beneath the openings 32.

As is apparent, the roof sections 23 are free to swing from a horizontal position as shown in Figures 1, 2, 3, and 5 to a vertical position. In order to adjust and hold the roof sections in the position desired, I provide an operating rod 32a for each row of sections.

Each rod 32a is arranged beneath its associated row of roof sections and extended through suitable openings in the side walls 10 to permit free longitudinal movement of the rods. One end of each rod is provided with a handle 33 and a plurality of notches 34 adapted to engage with a detent 35 for holding the rod against longitudinal movement.

Each section is connected to its associated rod 32a by a chain 36. The chain 36 in each instance may be arranged with its intermediate portion connected to the rod by a suitable clip as at 37, while its ends are connected to opposite sides of the enlargement 24 as at 38 and 39 respectively, Figure 5. It is, of course, entirely clear that the rods 32a may be manipulated for swinging the roof sections to any desired position and holding the sections in such adjusted position.

It is believed from the foregoing my invention can be clearly understood. It may be noted that the arboretum should be slightly embedded in the earth and soil raised to the desired level within the walls of the same. Also, if desired the concrete forming the arboretum may be colored or painted to give the same an artistic appearance.

While I have shown and described the preferred embodiment of my invention, it is to be understood that I am aware the general structure, combination, and arrangement of parts might be changed by those skilled in the art without departing from the spirit of my invention, as indicated by the appended claims.

I claim:

1. In a roof structure for an arboretum, a plurality of slabs arranged in series and overlapping relation, means for pivotally supporting each section at a point adjacent its end underlapping the next section, an upwardly turned lip on the pivoted end of each section to provide a gutter and also to hold the overlapping section in spaced relation, said gutters being provided with openings to drain water therefrom.

2. In a roof structure for an arboretum, a plurality of slabs arranged in series and in overlapping relation, one end of each slab having an enlargement and tapering in thickness toward its other end, the enlargement being provided with a longitudinal bore to receive a pivot or pintle whereby the slab may be swung upward into vertical position or lowered into horizontal position.

3. In a roof structure for an arboretum, a plurality of slabs arranged in rows, the slabs of each row having enlargements at one end with a bore extending longitudinally therethrough and tapering toward the other end, pivot rods extending through said bores and connecting said slabs of each series, a rod extending under the series of slabs, a chain connecting each slab with its associated rod, the intermediate portion of said chain being connected with the rod and its ends to opposite sides of the enlargement of the slab and means for sliding said rods longitudinally to swing said slabs into any desired position.

JAMES M. SHERMAN.